US008332364B2

(12) United States Patent
Dao et al.

(10) Patent No.: US 8,332,364 B2
(45) Date of Patent: Dec. 11, 2012

(54) METHOD FOR AUTOMATED DATA STORAGE MANAGEMENT

(75) Inventors: Quyen C. Dao, Dillsburg, PA (US); William D. Reeves, Mechanicsburg, PA (US); Paul L. Snyder, Mechanicsburg, PA (US)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 11/853,285

(22) Filed: Sep. 11, 2007

(65) Prior Publication Data

US 2007/0299879 A1 Dec. 27, 2007

Related U.S. Application Data

(63) Continuation of application No. 10/915,993, filed on Aug. 10, 2004, now abandoned.

(51) Int. Cl.
G06F 17/30 (2006.01)
(52) U.S. Cl. ........................................................ 707/665
(58) Field of Classification Search .................. 707/661, 707/665
See application file for complete search history.

(56) References Cited

U.S. PATENT DOCUMENTS

| 5,018,060 | A | 5/1991 | Gelb et al. |
| 5,239,647 | A | 8/1993 | Anglin et al. |
| 5,506,986 | A | 4/1996 | Healy |
| 5,644,766 | A | 7/1997 | Coy et al. |
| 5,659,743 | A | 8/1997 | Adams et al. |
| 5,899,995 | A | 5/1999 | Millier et al. |
| 6,131,190 | A | 10/2000 | Sidwell |
| 6,230,247 | B1 | 5/2001 | Cannon et al. |
| 6,353,837 | B1 | 3/2002 | Blumenau |
| 6,542,972 | B2 * | 4/2003 | Ignatius et al. ................ 711/154 |
| 6,654,830 | B1 | 11/2003 | Taylor et al. |
| 2002/0004816 | A1 | 1/2002 | Vange et al. |
| 2003/0037061 | A1 | 2/2003 | Sastri et al. |
| 2003/0088593 | A1 | 5/2003 | Stickler |
| 2003/0163457 | A1 * | 8/2003 | Yano et al. ......................... 707/3 |
| 2003/0225801 | A1 | 12/2003 | Devarakonda et al. |
| 2004/0243699 | A1 | 12/2004 | Koclanes et al. |

OTHER PUBLICATIONS

U.S. Appl. No. 10/915,993, Office Action dated Dec. 15, 2008.
U.S. Appl. No. 10/915,993, Amendment To Office Action filed Jan. 12, 2009.
Clark et al., "Including Transition Rules in Management Class Definition," IBM Technical Disclosure Bulletin, vol. 32, No. 11, Apr. 1990, p. 93.
Kaczmarski et al., "Using Policy Domains to Delegate Administrative Authority in Distributed System Managed Storage," IBM Technical Disclosure Bulletin, vol. 36, No. 8, Aug. 1993, pp. 135-137.

(Continued)

Primary Examiner — Thu-Nguyet Le
(74) Attorney, Agent, or Firm — William E. Schiesser; Hoffman Warnick LLC

(57) ABSTRACT

A system, method and program product for assigning management classes to data objects. The disclosed system includes a class assignment system for assigning a management class to an inputted data object, wherein the class assignment system analyzes historical usage characteristics of existing data objects that have attributes similar to the inputted data object; and a data analysis system that analyzes existing data objects to generate a knowledge base of historical usage characteristics. The historical usage characteristics are updated as existing objects make their way through the storage lifecycle.

7 Claims, 3 Drawing Sheets

OTHER PUBLICATIONS

Brown et al., "Goal-Oriented Buffer Management Revisited," INSPEC Abstract #C9609-6120-004, SIGMOD Record Conference, Jun. 4-6, 1996, vol. 25, No. 2, pp. 353-364.

Hendley, "Storage Management Issues and Options," INSPEC Abstract #C9502-5320-001, Publisher: Blenheim Online, London UK, 1993, pp. 259-265.

Duvvuru et al., "A Compile-Time Memory-Reuse Scheme for Concurrent Logic Programs," INSPEC Abstract #C9306-6120-034, Publisher: Springer-Verlag, Berlin GE, Sep. 1992, pp. 264-276.

U.S. Appl. No. 10/915,993, Final Office Action, dated May 14, 2009.
U.S. Appl. No. 10/915,993, Notice of Abandonment dated Dec. 24, 2009.
U.S. Appl. No. 10/915,993, Office Action dated May 13, 2008.
U.S. Appl. No. 10/915,993, Office Action dated Nov. 14, 2007.
U.S. Appl. No. 10/915,993, Office Action dated Jun. 19, 2007.
U.S. Appl. No. 10/915,993, Office Action dated Jan. 11, 2007.

* cited by examiner

METHOD FOR AUTOMATED DATA STORAGE MANAGEMENT

PRIORITY

The present case is a continuation of and claims priority to U.S. patent application Ser. No. 10/915,993 filed on Aug. 10, 2004 now abandoned entitled SYSTEM AND METHOD FOR AUTOMATED DATA STORAGE MANAGEMENT, the contents of which is hereby incorporated by reference.

FIELD OF THE INVENTION

The present invention relates generally to data storage management, and more specifically relates to a system and method for assigning management classes to data objects.

BACKGROUND OF THE INVENTION

In today's large scale storage systems, a tremendous amount of effort can be expended in assigning management criteria to individual or groups of data objects. In many modern operating systems, such as OS/390 and z/OS, "management classes" are used to define the criteria under which data elements will be administered. Namely, a defined management class will determine how an object will be managed over a period of time. For example, a management class may dictate that a given data object reside on DASD (Direct Access Storage Device) for x days, then be moved to a compressed format on DASD for y days, then be migrated to tape and stored for z days, and then be discarded.

Unfortunately, the process of assigning management classes is often done by a storage administrator who has to make various assumptions about the data. Often, however, the storage administrator is well removed from the application side of the environment that generated or utilizes the data. To address this, prescribed policies and procedures are often put into place for application implementers. Unfortunately, such procedures are often not followed or completely understood, thanks to a lack of training, oversight, etc. Moreover, once a storage management criteria is assigned to a group of objects, the criteria often does not remain up to date with the application requirements.

Such problems are further exacerbated by the use of storage area networks (SANs), in which data may be distributed over a disparate network. In such cases, it is not feasible for a storage administrator to know how a given set of data should be managed. Furthermore, in such scenarios, disparate groups of users often commingle data, further complicating the process. Additional complications arise when one organization assumes responsibility for another organization's data.

Accordingly, a need exists for a system and method that can effectively assign management classes to data objects in an automated manner.

SUMMARY OF THE INVENTION

The present invention addresses the above-mentioned problems, as well as others, by providing a system and method for automatically assigning management classes to data objects. In a first aspect, the invention provides a management class processing system, comprising: a class assignment system for assigning a management class to an inputted data object, wherein the class assignment system identifies historical usage characteristics of existing data objects that have attributes similar to the inputted data object; and a data analysis system that analyzes existing data objects to generate a knowledge base of historical usage data.

In a second aspect, the invention provides a program product stored on a recordable medium for processing management classes, comprising: program code for assigning a management class to an inputted data object by analyzing historical usage characteristics of existing data objects that have attributes similar to the inputted data object; and program code that analyzes existing data objects to generate a knowledge base of historical usage data.

In a third aspect, the invention provides a method for assigning management classes, comprising: analyzing existing data objects in a storage system to determine historical usage characteristics; inputting a new data object having at least one attribute; and assigning the new data object a management class by analyzing historical usage characteristics of similarly attributed existing data objects.

In a fourth aspect, the invention provides a system for deploying an application for assigning management classes to data objects, comprising: a computer infrastructure being operable to: analyze existing data objects in a storage system to determine historical usage characteristics; input a new data object having at least one attribute; and assign the new data object a management class by analyzing historical usage characteristics of similarly attributed existing data objects.

In a fifth aspect, the invention provides a computer software embodied in a propagated signal for assigning management classes to data objects, the computer software comprising instructions to cause a computer system to perform the following functions: analyze existing data objects in a storage system to determine historical usage characteristics; input a new data object having at least one attribute; and assign the new data object a management class by analyzing historical usage characteristics of similarly attributed existing data objects.

BRIEF DESCRIPTION OF THE DRAWINGS

These and other features of this invention will be more readily understood from the following detailed description of the various aspects of the invention taken in conjunction with the accompanying drawings in which.

Figure 1:
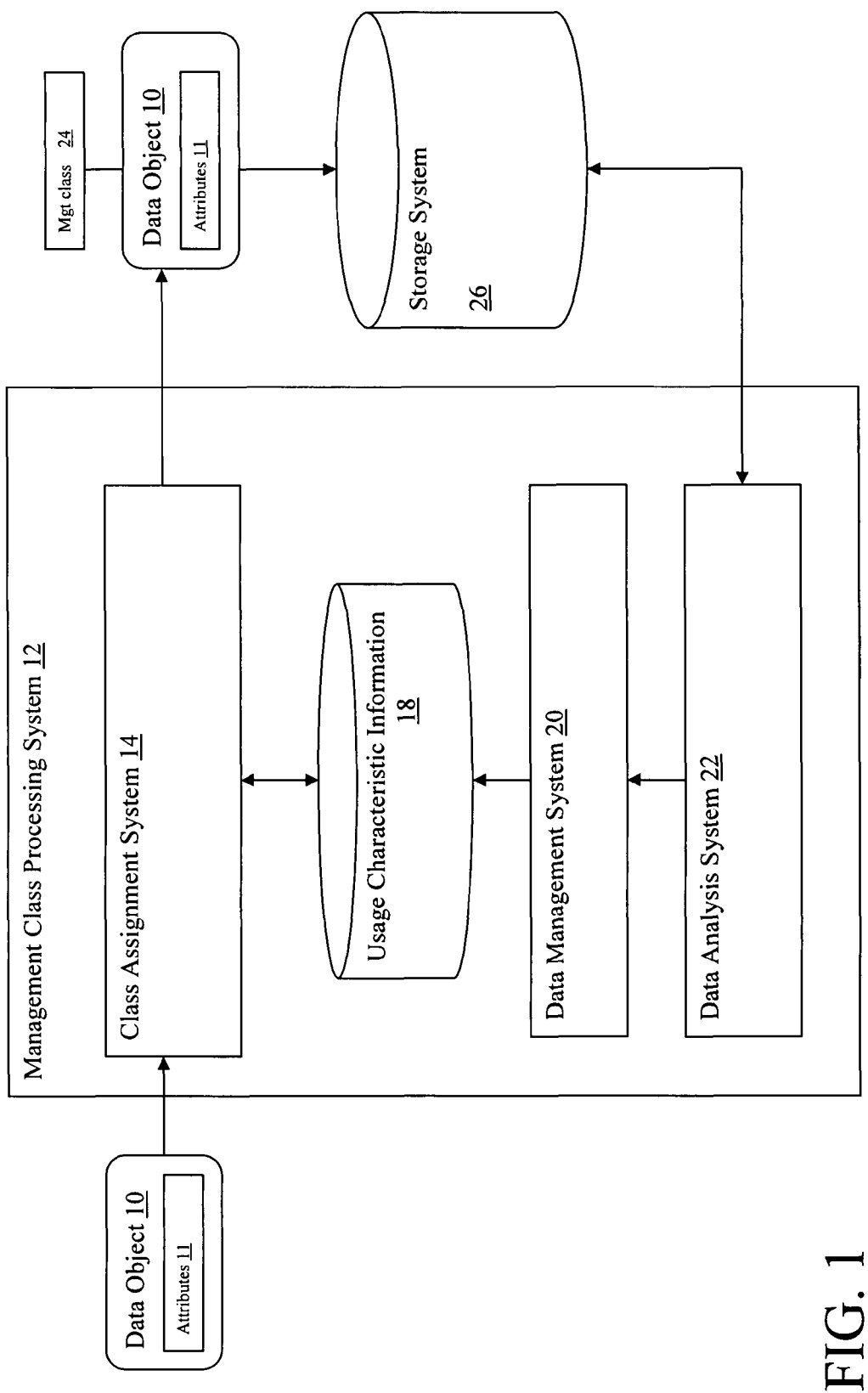
FIG. 1 depicts a management class processing system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring now to the drawings, FIG. 1 depicts a management class processing system 12 that assigns a management class 24 to an inputted data object 10. It should be understood that the term "management class" refers generically to any type of data storage criteria or scheme, and is not in any way limited to a particular programming construct. Similarly, the term "data object" may refer to any type of data element or set of data elements. Class assignment system 14 determines a management class by analyzing attributes 11 of the inputted data object 10 in view of a knowledge base of historical usage characteristics 18 of existing data objects. For the purposes of this disclosure, the term "existing" data objects may refer to objects in any storage state, e.g., on DASD, compressed, on tape, deleted, etc. To determine a management class 24, class assignment system 14 identifies usage characteristics of existing objects with similar attributes to that of inputted object 10, and then analyzes the usage characteristics of the identified existing objects to select an appropriate class.

In one illustrative embodiment, object attributes 11 may include information such as name, data object type, size, creation information, source node information, etc., relating to object 10. Thus, attributes of inputted data object 10 may include that the object was created at node X by application Y with a size Z. Historical usage characteristics 18 generally comprises usage information, i.e., how the existing data objects were used/managed over time, e.g., it was stored on DASD for x days, then compressed for y days, then moved to storage for z days, etc.

Then, based on a set or rules or logic, class assignment system 14 would assign a management class to data object 10. For instance, if class assignment system 14 found a historical record of data objects with similar name, attribute, creating node and application metadata, the class assignment system 14 would base the selection of the management class for data object 10 upon the actual usage traits of its predecessors. It should be understood that class assignment system 14 could utilize any logic for selecting management classes based on its analysis of the data object attributes 11 and historical usage characteristics 18.

Historical usage characteristics 18 may be stored in a knowledge base as metadata that is managed by a data management system 20. Data management system 20 would for instance be responsible for storing, updating, grouping, searching, etc., historical usage characteristics 18. Historical usage characteristics 18 could be extracted, collected, and/or processed (i.e., "analyzed") from a storage system 26 by a data analysis system 22. Storage system 26 represents a storage environment for any type of enterprise, system, or subsystem. Storage system 26 may include, e.g., hardware, software, an operating system, etc., necessary to manage data stored therein. In one illustrative embodiment, data analysis system 22 would periodically gather usage information about the objects stored in storage system 26. Alternatively, data analysis system 22 would obtain usage information whenever a triggering event (e.g., allocate, close, recall, etc.) was detected in the storage system 26. This information would then be passed to data management system 20, which would then be stored in the knowledge base of historical usage characteristics 18. Thus, historical usage characteristics 18 can be collected for each existing data object in storage system 26 as the data object makes its way through the storage lifecycle. Thus, if an object gets recalled to DASD, goes to tape, gets compressed, gets deleted, etc., historical usage characteristics 18 get updated.

Moreover, after a data object 10 is assigned a management class 24, it can be stored in the storage system 26 such that its usage characteristics can eventually become part of the knowledge base of historical usage characteristics 18. Thus, as more and more data objects are added to storage system 26, the knowledge base of historical usage characteristics 18 will grow, providing increased efficacy in assigning management classes to new data objects.

It should be recognized that any or all of the various functions described herein could be integrated within the facilities of the storage system 26. Such facilities, which perform any pertinent data management functions, e.g., allocate, close, recall, delete, migrate, etc., may trigger the appropriate update to usage characteristic information 18. Thus, usage characteristic information 18 could be initially populated with an initialization routine, and then be updated automatically any time a triggering event occurs.

Figure 2:
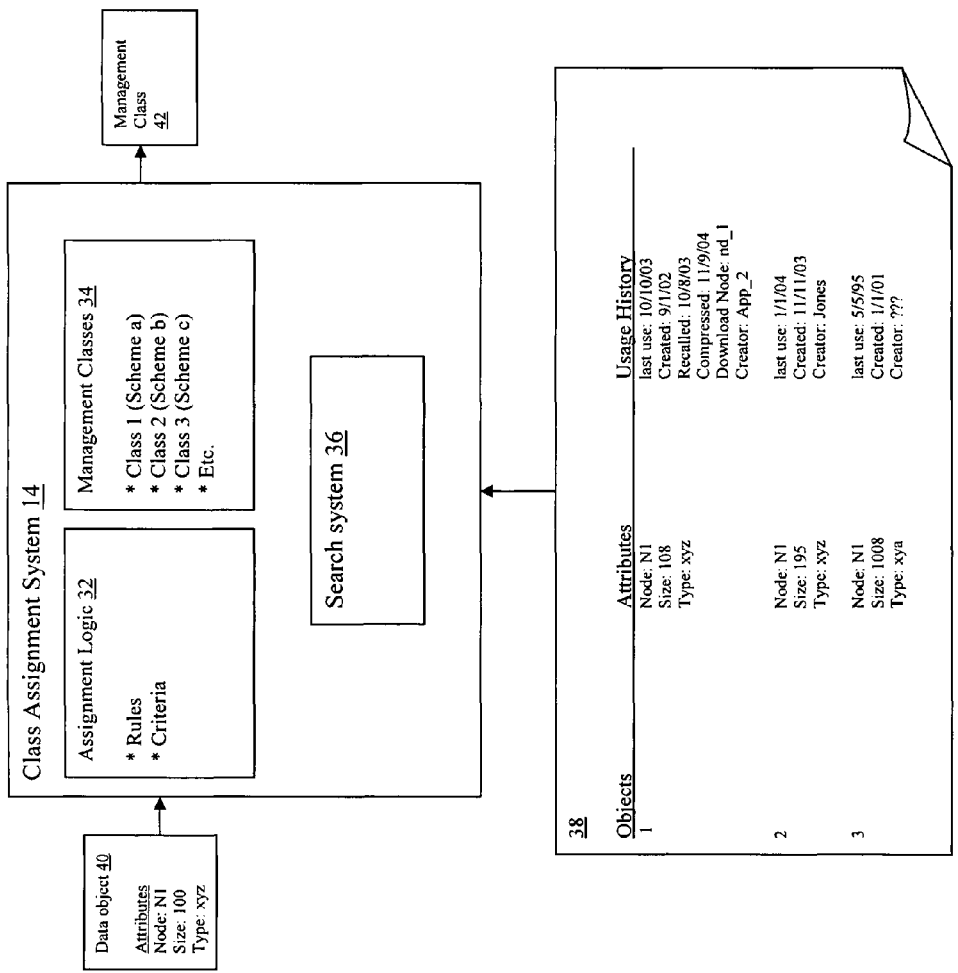
FIG. 2 depicts a class assignment system of the system of FIG. 1.

Referring now to FIG. 2, an illustrative embodiment of a class assignment system 14 is shown. In this example, class assignment system 14 receives a data object 40. Assignment logic 32 then determines what attributes are known about data object 40. In this case, it is known that data object 40 has a node of origin N1, a size 100, and a type xyz. Assignment logic 32 then instructs search system 36 to search the knowledge base of historical usage characteristics 18 (FIG. 1) for similarly attributed data objects. Search system 36 could be incorporated into class assignment system 14, or reside elsewhere within system 12. In this example, a set of results 38 comprising matching (or near matching) attributes are identified and returned with their historical usage characteristics. Included for each data object is a set of usage history (e.g., last date of use, creation date, recall data, download node data, creator, etc.).

After receiving the results 38, assignment logic 32 applies a set of rules to the returned information and selects a management class 42 from the set of management classes 34. Alternatively, class assignment system 14 could dynamically create a management class for the inputted data object 40. Moreover, in some instances, assignment logic 32 may simply assign a default management class if no results 38 were found in the knowledge base. In the example shown in FIG. 2, the first two existing data objects have the exact same node of origin and type, and a similar size, while the third existing data object has the same node of origin, and a similar type. Thus, assignment logic 32 would analyze the usage history of each of the existing objects and determine an appropriate management class 42 to be assigned to the inputted data object 40. As noted above, any logic could be utilized to assign the management class based on the usage history of similarly attributed objects.

Each of the possible management classes 34 has an associated storage scheme (i.e., schemes a, b and c) to be used for managing the data object to which it is assigned. For example, a management class may dictate that the data object remain on DASD for six months, then be stored on DASD in a compressed form for two months, then be transferred to tape for one year, then be destroyed.

In further illustrative embodiments involving for instance involving OS/390 or z/OS operating systems, data could be analyzed from System Management Facilities (SMF), which would provide a complete historical view regarding how data objects were used in the past. SMF collects and records system and job-related information that an installation can use for, e.g., billing users, reporting reliability, analyzing configurations, scheduling jobs, summarizing direct access volume activity, evaluating dataset activity, profiling system resource use, maintaining system security, etc. Data could also be analyzed from DFSMShsm_(Data Facilities Storage Management System Hierarchical Storage Manager™), which would provide details of instances where data was recalled back from another medium, potentially signaling an anomaly in the current management class. DFSMShsm is a facility that automatically performs space management and availability management in a storage device hierarchy. DFSMShsm makes sure that space is available on a DASD volume so that one can extend old datasets & allocate new ones. DFSMShsm also makes sure that backup copies of datasets are always available in case working copies are lost or corrupted. Moreover, data could be analyzed from the data-using processes themselves, thus giving a rough idea regarding how frequently and in what manner the data object was created and used.

Further features of the invention may include the ability to suggest a management class to the data object, the ability to override the class assignment system 14, and the ability to build new management classes as needed.

Figure 3:
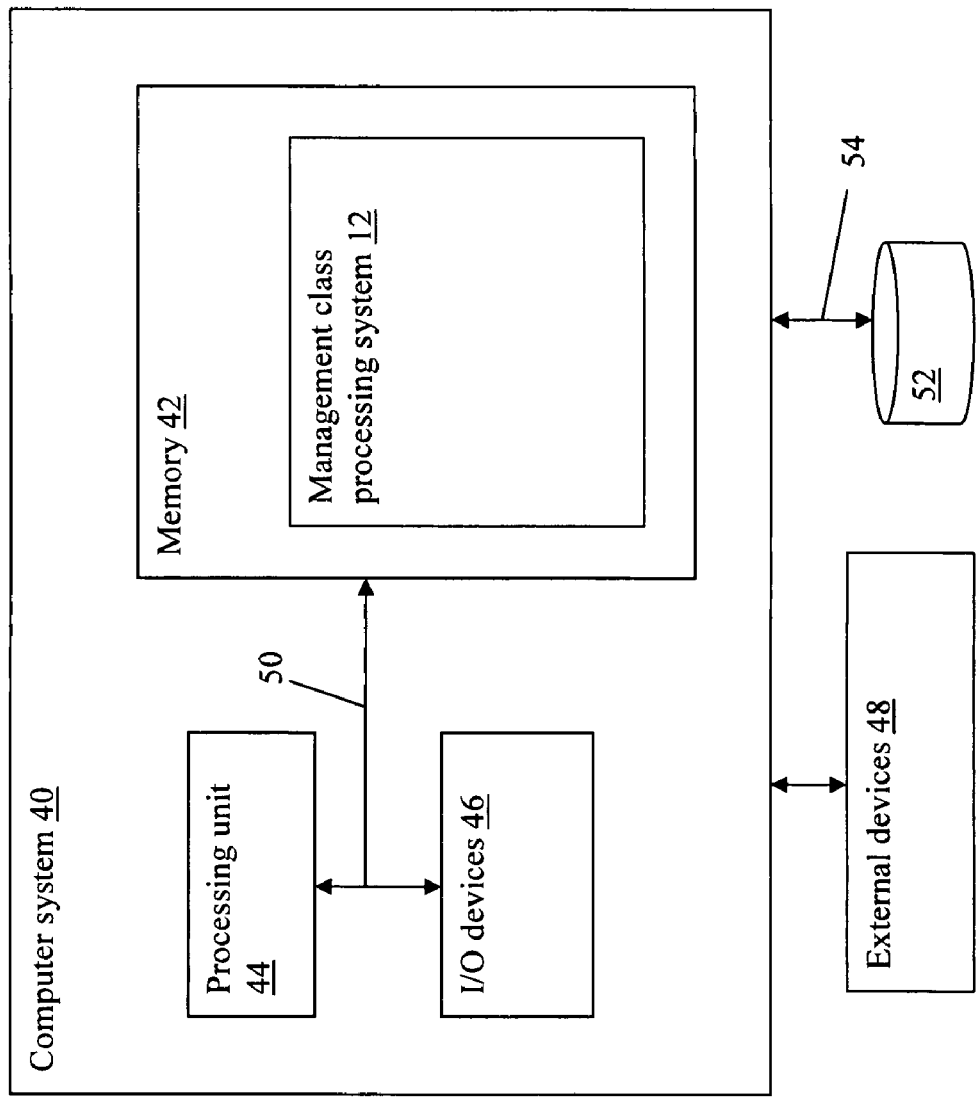
FIG. 3 depicts a computer system for implementing the system of FIG. 1.

Referring to FIG. 3, it is noted that management class processing system 12 may be implemented as a program product on computer system 40. In general, computer system 40 may comprise, e.g., a desktop, a laptop, a workstation, etc. Moreover, computer system 40 could be implemented as part of a client and/or a server. Computer system 40 generally includes a processing unit 44, memory 42, bus 50, input/output (I/O) interfaces 46, external devices/resources 48 and storage 52. The processing unit 44 may comprise a single processing unit, or be distributed across one or more processing units in one or more locations, e.g., on a client and server. Memory 42 may comprise any known type of data storage (i.e., computer readable medium) and/or transmission media, including magnetic media, optical media, random access memory (RAM), read-only memory (ROM), a data cache, a data object, etc. Moreover, any memory 42 may reside at a single physical location, comprising one or more types of data storage, or be distributed across a plurality of physical systems in various forms.

I/O interfaces 46 may comprise any system for exchanging information to/from an external resource. External devices/resources 48 may comprise any known type of external device, including speakers, a CRT (Cathode Ray Tube), LED (Light Emitting Diode) screen, hand-held device, keyboard, mouse, voice recognition system, speech output system, printer, monitor/display, facsimile, pager, etc. A bus 50 may be included to provide a communication link between each of the components in the computer system 40 and likewise may comprise any known type of transmission link, including electrical, optical, wireless, etc. Although not shown, additional components, such as cache memory, communication systems, system software, etc., may be incorporated into computer system 40.

Storage system 26 and the knowledge base of historical usage characteristics 18 may be embodied in any type of storage 52 (e.g., a relational database, etc.) and may include one or more storage devices, such as RAM, ROM, a magnetic disk drive and/or an optical disk drive. Data storage can also be distributed across, for example, a local area network (LAN), wide area network (WAN) or a storage area network (SAN) (not shown). Thus, storage system 26 and/or knowledgebase of historical usage characteristics 18 could have some or all of their data stored remotely over a distributed network, thereby allowing for the pooling of resources and information.

Such a network 54 can be any type of network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 40 comprising management class processing system 12 could be created, maintained and/or deployed by a service provider that offers the functions described herein for customers. That is, a service provider could off the service of generating management classes, e.g., as an application service provider.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for assigning management classes, comprising:
    analyzing existing data objects in a storage system to determine historical usage characteristics;
    inputting a new data object having attributes that include a node at which the new data object was created and a size of the new data object;
    assigning the new data object a management class by analyzing historical usage characteristics of data objects having the attributes; and
    storing the management class with the new data object on a storage device.

2. The method of claim 1, wherein the historical usage characteristics are stored in a knowledge base.

3. The method of claim 1, wherein the assigning step includes the step of selecting a management class from a set of management classes.

4. The method of claim 1, wherein the assigned management class dictates a storage scheme for the data object.

5. The method of claim 4, wherein the assigning step includes the step of searching the knowledge base of historical usage characteristics.

6. The method of claim 1, comprising the further step of storing the new data object in the storage system with an assigned management class.

7. A method for assigning management classes, comprising:

analyzing existing data objects in a storage system to determine historical usage characteristics;

inputting a new data object having at least one attribute;

assigning the new data object a management class by analyzing historical usage characteristics of similarly attributed existing data objects;

storing the management class with the new data object on a first storage device; and moving the new data object to a second storage device, wherein the management class is stored with the data object at the second storage device.

* * * * *